United States Patent Office 3,527,333
Patented Sept. 8, 1970

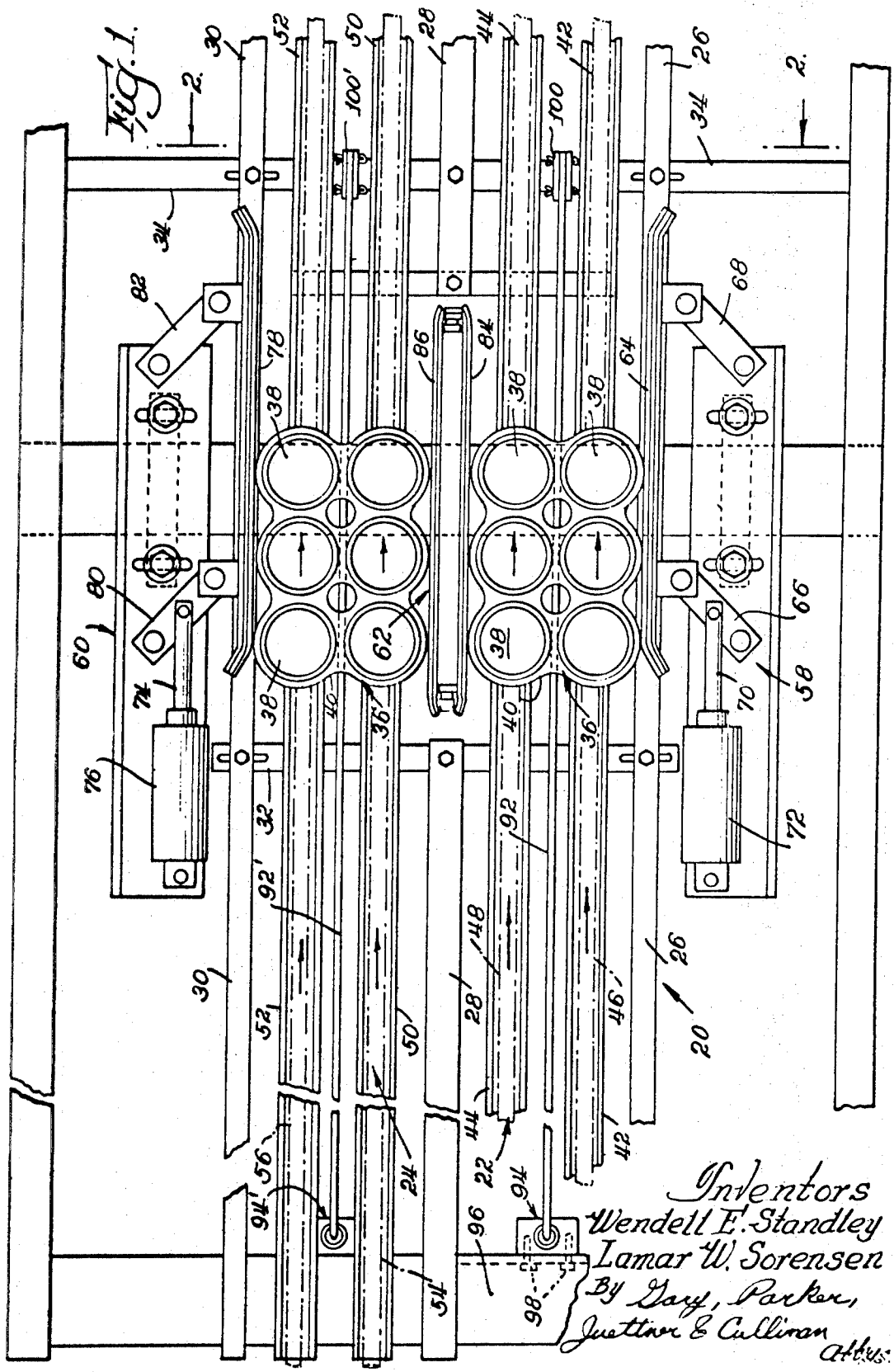

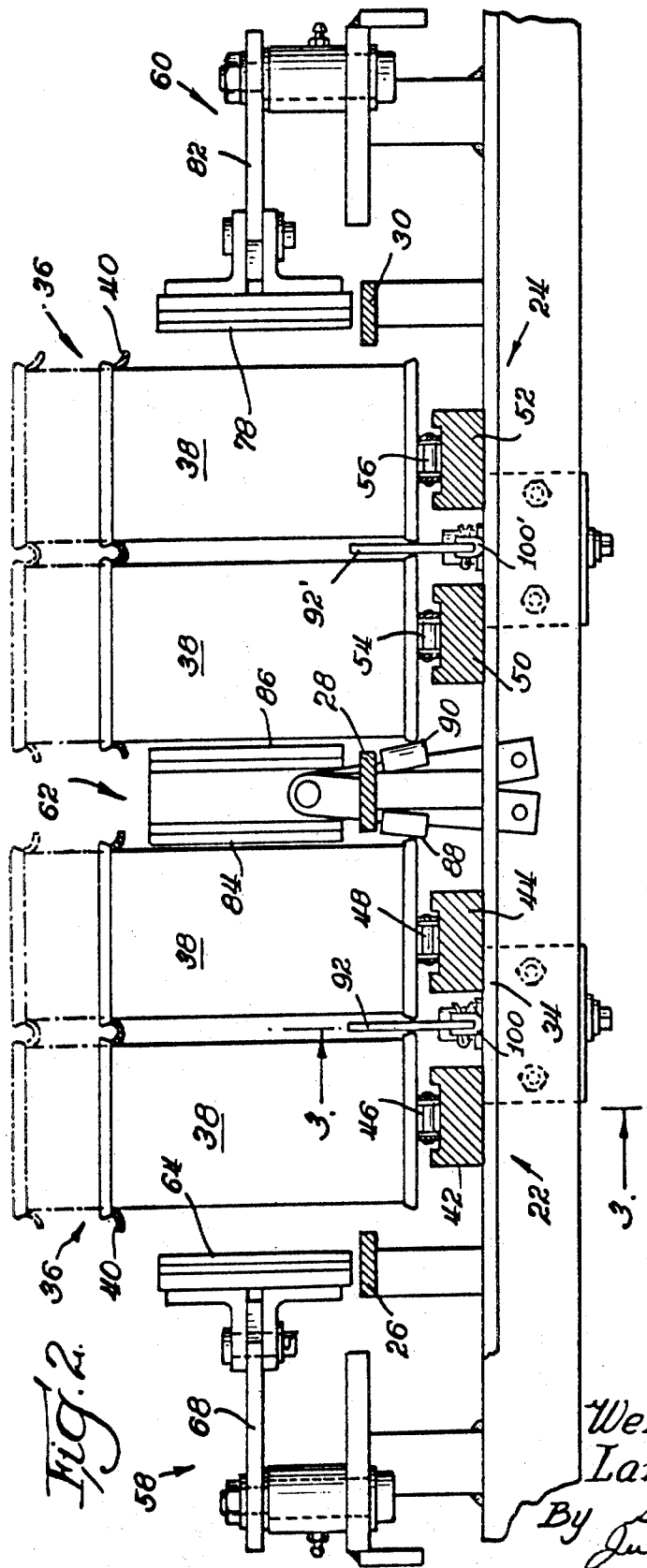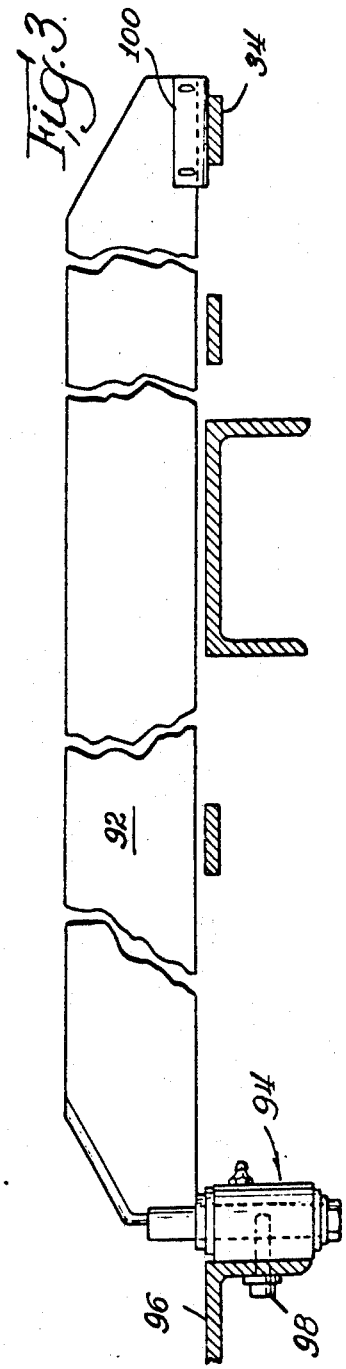

3,527,333
ARTICLE CONVEYOR MECHANISM
Wendell E. Standley, Lake Forest, and Lamar W. Sorensen, Des Plaines, Ill., assignors to Johns-Nigrelli-Johns, Inc., Skokie, Ill., a corporation of Illinois
Filed Sept. 29, 1967, Ser. No. 671,797
Int. Cl. B65g 47/26
U.S. Cl. 198—30                                                9 Claims

ABSTRACT OF THE DISCLOSURE

Article conveyor mechanism including movable pressure plate or divider means for guiding and retaining articles which are conveyed along a given path, such pressure plate means serving to separate two rows of articles and being particularly suitable for use in conjunction with a portion of a conveyor where a lateral force is applied to the articles whereby such movable pressure plate means will retain the articles in proper relative positions while such force is applied thereto without interfering with the application of such force to more than one side-by-side row of articles.

BRIEF SUMMARY OF THE INVENTION

This invention relates to an article conveyor which is particularly adapted for conveying cans or bottles or the like and is also suited for conveying various other articles. In the illustrative embodiment to be described herein, the conveyor mechanism is described for use in conveying six-packs of cans, but it will be understood that the invention is in no way limited to such use.

The present invention is particularly concerned with that portion of a conveyor where a lateral holding force is applied to the articles being conveyed. For example, many packaging systems or the like include grouper mechanisms which separate the articles into a plurality of groups each of which include a predetermined number of articles. A grouper mechanism will usually include stop means so that an article can be stopped after a predetermined number of articles have passed a given location so as to create a space before another group of articles is advanced.

Grouper mechanisms function in various ways but they do often include stop means associated with a conveyor, and in many instances it is advantageous to use stop means which clamps the articles laterally, particularly when the mechanism is to be used with articles which vary in height and therefore cannot conveniently be held by vertical clamping means. In addition to the use of lateral clamping means for article grouping purposes, it will be understood that there are various other applications where such clamping means may be utilized to support articles being conveyed, one example being where movable side gripper belts serve to support and/or advance a group of articles which are not supported from beneath.

Where a group of articles such as cans or bottles are arranged in a plurality of rows, the application of a lateral clamping force to one of the rows of articles will engage the same against an adjacent row, and unless the articles are held in their proper positions the articles in one row may become misaligned and be moved out of position so as to interfere with articles in an adjacent row. Such a problem is most likely to occur where the sides of the articles are not flat, such as when conveying round cans or bottles or the like.

The foregoing problem may not be a serious one when the articles being conveyed are packaged in six-packs or the like of a type which substantially enclose the articles. For example, where six cans are packaged in a six-pack of a type which substantially encloses the cans and firmly maintains their positions relative to one another, the two rows of cans within each six-pack may not be free to move out of their intended positions when lateral pressure is applied to the six-pack for holding or stopping purposes. On the other hand, certain types of six-packs or the like comprise nothing more than a generally flat flexible plastic having apertures to receive the upper ends of cans, and when such packages are used only the upper ends of the cans are held in fixed positions relative to one another while the lower ends thereof are more or less free. An example of a package of the latter type is shown in U.S. Pat. 2,874,835.

It will thus be understood that the conveyor apparatus of the present invention is particularly well suited for use in conjunction with articles which are packaged in a six-pack or the like of the type described above where each article throughout its length is not firmly held in a fixed position relative to the other articles in a package. It will further be understood that the present invention is well suited for use where loose or unpackaged articles, e.g., loose cans or bottles or the like, are conveyed on a conveyor in a plurality of side-by-side rows.

It is therefore an object of the present invention to provide an improved conveyor mechanism including pressure plate or divider means positioned so as to be interposed between two side-by-side rows of articles in order to maintain such rows in alignment even when they are subjected to a lateral clamping force.

A further object of the invention is to provide an improved conveyor as last above-mentioned where the pressure plate means is movable in a direction generally transverse to the length of the conveyor to facilitate lateral clamping of more than one row of articles by a single laterally movable clamping member.

The foregoing and other objects and advantages of the invention will be apparent from the following description of a preferred embodiment thereof, taken in conjunction with the accompanying drawings.

DESCRIPTION OF THE DRAWINGS

FIG. 1 is a fragmentary top plan view showing a conveyor equipped with movable pressure plate means constructed in accordance with the present invention;

FIG. 2 is an enlarged transverse sectional view taken substantially along the line 2—2 of FIG. 1; and FIG. 3 is a fragmentary sectional view taken substantially along the line 3—3 of FIG. 2 showing a pivotally mounted pressure plate member constructed in accordance with one embodiment of the present invention.

Now, in order to acquaint those skilled in the art with the manner of making and using our invention, we shall describe, in conjunction with the accompanying drawings, certain preferred embodiments of the invention.

DETAILED DESCRIPTION OF THE INVENTION

Referring now to the drawings, FIG. 1 shows a conveyor 20 having two parallel conveyor sections 22 and 24, each of the two conveyor sections being able to accommodate a row of six-packs of cans or the like. The conveyor section 22 is defined by a fixed outer guide rail 26 and a fixed center guide rail 28, and the conveyor section 24 is defined by the fixed center guide rail 28 and a second fixed outer guide rail 30. The guide rails 26, 28 and 30 are suitably interconnected in fixed parallel relation by a plurality of transverse brace members such as shown for example at 32 and 34. In the embodiment being described each of the conveyor sections 22 and 24 is of a width designed to accommodate two rows of articles in side-by-side relation, and by way of example the articles are described herein as six-packs of cans, there being two parallel rows of three cans each or a total of six cans in each six-pack.

It was pointed out earlier herein that the present invention is particularly suited for use in conveying articles which are either loose or else are packaged in such a manner that they are not firmly held in fixed positions relative to one another. The six-packs 36 described herein each comprise a group of six cans 38 interconnected at their upper ends by a generally flat plastic sheet or collar 40 having apertures to receive each of the cans. A package of the type shown at 40 is more fully described in the above-mentioned U.S. Pat. 2,874,835, and it will be understood that the package 40 is flexible and will not prevent substantial movement of the lower ends of the cans 38 relative to one another.

In order to advance the articles or six-packs 36 along the conveyor 20 each of the conveyor sections 22 and 24 is provided with a pair of endless drive chains, and the articles rest on top of such chains and move therewith. Thus, the conveyor section 22 is equipped with a pair of parallel chain track or guide members 42 and 44, and a pair of endless drive chains 46 and 48 move on the upper surfaces of such track members and support the articles to be conveyed. In a similar manner, the conveyor section 24 is equipped with a pair of parallel chain track or guide members 50 and 52, and a pair of endless drive chains 54 and 56 move on the upper surfaces of such track members and support the articles to be conveyed. Thus, a plurality of the six-packs 36 will be supported on the conveyor section 22 and be advanced therealong between the fixed guide rails 26 and 28 by the endless chains 46 and 48, and a plurality of the six-packs 36 will also be supported on the conveyor section 24 and be advanced therealong between the fixed guide rails 28 and 30 by the endless chains 54 and 56. It will be understood with reference to the conveyor section 22 that one row of three cans 38 in each of the six-packs will be supported on the drive chain 46 while a second row of three cans 38 will be supported on the drive chain 48. Consequently, a conveyor of the type described is well suited for use with six-packs of the type shown where the lower ends of the cans in the two rows are not firmly held in definite positions relative to one another, and is also well suited for use where loose cans are conveyed in parallel rows.

The conveyor 20 includes means for stopping the flow of six-packs 36 on the two conveyor sections 22 and 24. As previously indicated, one reason for providing such stopping means is to permit grouping of the articles, e.g., the grouping together of four six-packs or 24 cans comprising the contents of a single case to facilitate the automatic loading of cases. Thus, in the embodiment being described it may be desirable that the conveyor 20 deliver the articles to a case loader in groups of four six-packs 36, two from the conveyor section 22 and two from the conveyor section 24. Such grouping can be accomplished by periodically stopping the flow of six-packs on the conveyor sections 22 and 24, e.g., by actuating stopping means, releasing the stopping means and permitting two six-packs on each conveyor section to advance beyond the stopping means, and then again actuating the stopping means so as to produce a space before the next article group is advanced. Various types of stopping means may be used, but it is generally considered desirable to provide a stop member which applies lateral pressure to the articles on the conveyor in order to stop the flow thereof, the stop member being actuated automatically by electric eye means or the like.

In the embodiment being described there are provided two movable stop assemblies 58 and 60, and a fixed stop assembly 62. The stop assembly 58 comprises a parallelogram arrangement including a pressure pad 64 which is carried on a pair of pivotally mounted parallel links 66 and 68. The link 66 is connected to a piston rod 70 and it will be understood that when the latter is withdrawn into a hydraulic cylinder 72 the pressure pad 64 will be moved inwardly against a six-pack 36 on the conveyor section 22 so as to clamp the latter against the fixed stop assembly 62. The stop assembly 60 functions in a similar manner so that upon withdrawal of a piston rod 74 into a hydraulic cylinder 76 a pressure pad 78 carried by pivotally mounted links 80 and 82 will be moved inwardly against a six-pack 36 on the conveyor section 24 so as to clamp the latter against the fixed stop assembly 62.

As shown in FIG. 2, the central stop assembly 62 includes oppositely disposed fixed friction pads 84 and 86, and a pair of oppositely disposed spring-loaded arms 88 and 90 which have surfaces made of anti-friction material. When a six-pack 36 on the conveyor section 22 is clamped by the pressure pad 64 against the pressure pad 84, the inwardly disposed cans 38 will engage and deflect the spring-loaded arm 88, whereby upon release of the pressure pad 64 the arm 88 will spring outwardly thus instantly separating the cans from the pressure pad 84 so that the six-pack will immediately be advanced on the conveyor. The spring-loaded arm 90 performs the same function with respect to articles on the conveyor section 24 thus assuring that there will be no delay in advancement of the articles once the pressure pad 78 has been released.

Conveying and grouping apparatus of the foregoing type presents a serious problem where the articles being conveyed such as cans or bottles or the like are either loose or as in the embodiment being described are unrestrained at their lower ends so as to be capable of substantial movement relative to one another. Thus, application of lateral pressure by the side clamp assembly 58 will press the outer row of articles against the adjacent inner row of articles. Where the articles comprise round cans or bottles or the like, the articles in the outer row, to the extent that they are not restrained, will tend to move between or around the articles in the adjacent inner row, and thus become improperly positioned on the conveyor. An important feature of the present invention comprises a floating pressure plate or divider, to be described hereinbelow, which separates each row of articles on the conveyor and thereby prevents occurrence of the foregoing problem.

As shown in FIG. 1, a pressure plate or divider 92 is pivotally supported at one end by a vertical hinge assembly 94 which is connected to a mounting plate 96 by a plurality of screws or the like 98. The pressure plate 92 is positioned so that it extends parallel to the conveyor section 22 and is disposed approximately along the longitudinal centerline thereof. The leading hinged end of the pressure plate 92 is located in advance of the stop assemblies 58 and 60, and the length of the pressure plate is such that it extends through the area where the articles are engaged by the stop assemblies. As best shown in FIGS. 2 and 3, the trailing free end of the pressure plate 92 has mounted thereon a U-shaped bearing member 100 made of suitable anti-friction material, and the bearing member 100 preferably rides on the transverse support plate 34.

It will be seen from the foregoing that the leading end of the pressure plate 92 is hingedly mounted and thus cannot move laterally, and it is located at the centerline of the conveyor section 22, while the opposite or trailing end of the pressure plate is free to move laterally about the vertical axis of the hinge assembly 94, the free end preferably receiving vertical support from the transverse support plate 34. FIG. 2 shows the manner in which the lower edge of the pressure plate 92 is disposed beneath the bottoms of the cans 38 while the upper edge thereof extends upwardly above the bottoms of the cans so as to project between and thereby separate the inner and outer rows of cans which comprise each of the six-packs 36.

It will now be understood that when six-packs 36 of the type described herein are being conveyed along the conveyor section 22 so as to move from left to right as viewed in FIG. 1, with the cans 38 which form each six-pack being interconnected at their upper ends only by the flexible collar or flat package member 40, they will advance freely over the leading end of the pressure plate 92, and the two rows of cans 38 will be separated by the pressure plate. It will be noted that where the articles comprise cans or bottles or the like which are round, any slight misalignment between the pressure plate 92 and the longitudinal centerline of the six-pack 36 will present no problem since the six-pack will readily be cammed into a centered position relative to the pressure plate.

If the stop assembly 58 is actuated as the six-pack 36 reaches a position adjacent the pressure pad 64, the pad 64 will move inwardly clamping the six-pack against the pad 84, and it will be understood that because the pressure plate or divider 92 is able to float or move laterally about the axis of the hinge assembly 92 is will not interfere with such clamping action. However, the plate 92 does positively separate the two rows of cans 38 which comprise the six-pack. Thus, even though the lower ends of the cans are substantially unrestrained by the flexible package member 40, no misalignment of such cans will occur due to the lateral clamping pressure. The conveyor section 24 is equipped with a pressure plate 92' substantially identical to the pressure plate 92. Thus, the pressure plate 92' has its leading end supported by a hinge assembly 94' which is connected to the support plate 96, and the free trailing end of the plate 92' is provided with a U-shaped bearing member 100' which preferably rides on the transverse support plate 34. The pressure plate 92' thus prevents misalignment of the two rows of cans or articles 38 when a six-pack 36 on the conveyor section 24 is clamped between the clamp pads 78 and 86.

It has been pointed out hereinabove that the pressure plates 92 and 92' do not interfere with the clamping of the six-packs because of the fact that such pressure plates can float or move laterally. However, while the ability of such pressure plates to move laterally in the clamping area is an essential feature of the present invention, it will readily be understood that they need not be hingedly mounted as in the embodiment described. For example, the leading ends of such pressure plates may be fixedly mounted if the plates themselves are made of a flexible material so that they can flex back and forth laterally under the force of a clamping operation. It will also be noted that where the two conveyor sections are arranged sibe-by-side as the sections 22 and 24 in FIG. 1, one of the movable clamp assemblies 58 and 60 may be replaced with a fixed clamp pad if the stop assembly 62 between the two conveyors is hinged at one end or otherwise mounted so that it can float laterally.

The present invention has been described in conjunction with a conveyor associated with lateral clamping or stopping means for purposes of delivering articles in predetermined groups. However, it should be understood that the floating pressure plate or divider of the present invention has various other applications where lateral pressure is to be applied to articles being conveyed in a plurality of rows, such as where endless side pressure belts are utilized to support articles above their lower ends and/or to convey them along a given path. Thus, while we have described our invention in certain preferred forms, we do not intend to be limited to such forms except as insofar as the appended claims are so limited, since modifications coming within the scope of our invention will readily occur to those skilled in the art, particularly with our disclosure before them.

We claim:

1. In a conveyor for conveying a plurality of articles arranged in at least two parallel rows, the improvement comprising, in combination, a conveyor passageway for accommodating at least two side-by-side rows of articles, side holding means on opposite sides of said passageway, one of said side holding means being operable for applying lateral pressure to said rows of articles so as to urge the articles in one row toward the articles in an adjacent row, pressure plate means extending parallel to said passageway approximately midway between two of said rows so as to at least partially separate two adjacent rows of articles disposed along said passageway, and mounting means for mounting said pressure plate means so as to permit lateral movement of the latter in the area of said side holding means to prevent misalignment of the rows of articles when the articles are held between said holding means.

2. The invention of claim 1 where said pressure plate means is partially disposed beneath said articles and extends upwardly between the lower ends of the articles in one row and the articles in an adjacent row.

3. The invention of claim 1 where one end of said pressure plate means is fixed against lateral movement and the other end thereof is free to move laterally, the fixed end of said pressure plate means being longitudinally spaced from said side holding means.

4. The invention of claim 3 where said pressure plate means is mounted at said fixed end for pivotal movement about a general vertical axis.

5. The invention of claim 3 where the free end of said pressure plate means rides on a generally horizontal surface which provides vertical support for said free end.

6. The invention of claim 1 where said pressure plate means comprises a relatively thin flat plate oriented so as to be disposed in a vertical plane.

7. The invention of claim 3 where the leading end of said pressure plate means is located in advance of said side holding means and is fixed against lateral movement, and where said pressure plate means is of such a length that it extends approximately past the location of said side holding means.

8. In a conveyor for conveying a plurality of articles arranged in at least two parallel rows, the improvement comprising, in combination, a conveyor passageway for accommodating at least two side-by-side rows of articles, side holding means on opposite sides of said passageway, one of said side holding means being operable for applying lateral pressure to said rows of articles so as to urge the articles in one row toward the articles in an adjacent row, and pressure plate means extending parallel to said passageway approximately midway between two of said rows so as to at least partially separate two adjacent rows of articles disposed along said passageway, the leading end of said pressure plate means being located in advance of said side holding means and being fixed against lateral movement while the opposite end thereof is free to move laterally, said pressure plate means being of such a length that it extends approximately past the location of said side holding means and is laterally movable in the area of said side holding means so as to prevent misalignment of the rows of articles when the articles are held between said holding means, and said pressure plate means being partially disposed beneath said articles so as to extend upwardly between the lower ends of the articles in one row and the articles in an adjacent row.

9. The invention of claim 8 where said pressure plate means comprises a relatively thin flat plate oriented so as to be disposed in a vertical plane, said flat plate being pivotally mounted at its leading end for movement about a generally vertical axis.

References Cited

UNITED STATES PATENTS

Re. 25,852  9/1965  Nigrelli _____ 53—159
3,180,066  4/1965  Mahaffy _____ 53—247

RICHARD AEGERTER, Primary Examiner

U.S. Cl. X.R.

53—159